Feb. 22, 1938. W. R. UHLEMANN 2,108,875
EYEGLASSES
Filed April 22, 1937  2 Sheets-Sheet 1
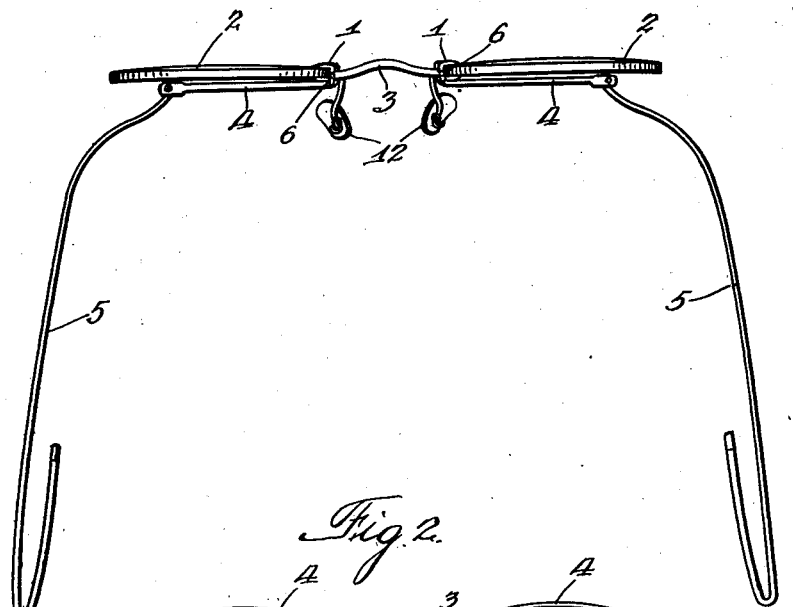
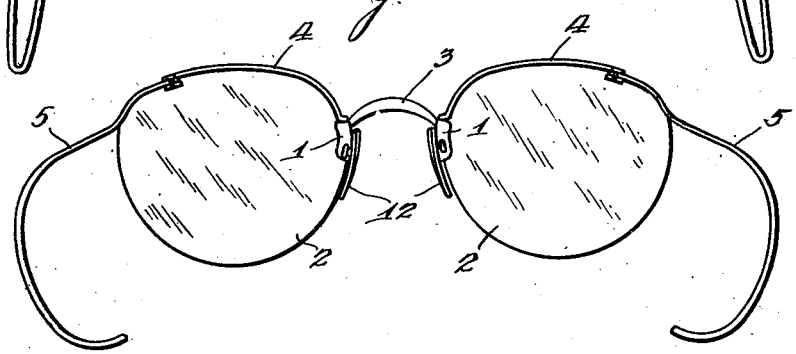
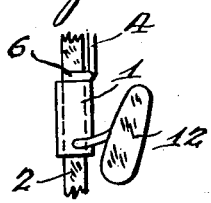  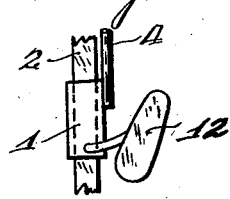 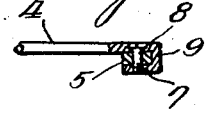

Feb. 22, 1938. W. R. UHLEMANN 2,108,875
EYEGLASSES
Filed April 22, 1937 2 Sheets-Sheet 2
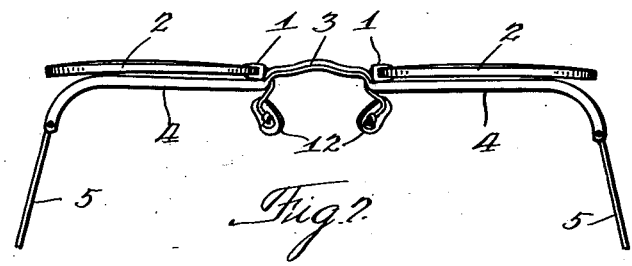
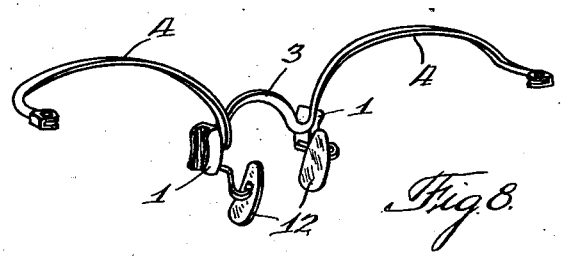
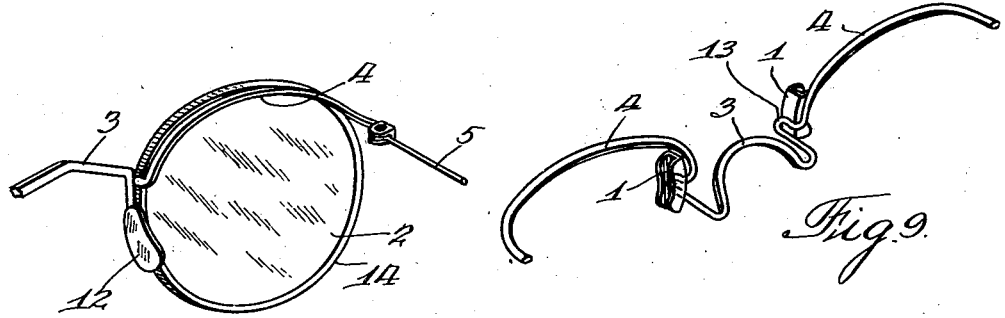
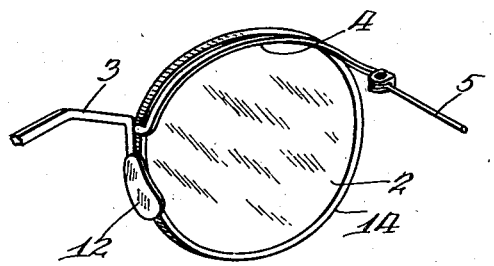
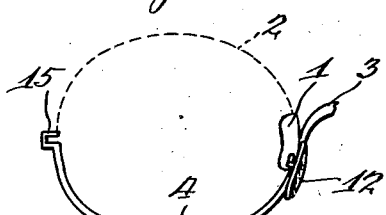
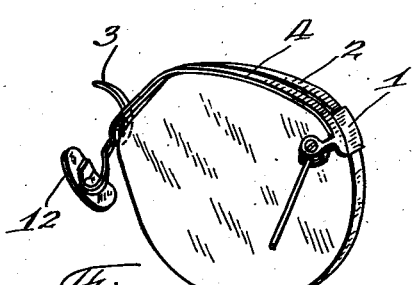

Patented Feb. 22, 1938

2,108,875

UNITED STATES PATENT OFFICE 2,108,875

EYEGLASSES

William R. Uhlemann, Evanston, Ill.

Application April 22, 1937, Serial No. 138,318

6 Claims. (Cl. 88—47)

My invention relates to eyeglasses, and more specifically it relates to a mounting means for the temple.

One of the objects of my invention is to provide an improved temple mounting which prevents strain from being transmitted to the lenses.

A further object of my invention is to provide a temple mounting that requires a minimum amount of labor in attaching the mounting.

A further object of my invention is to provide an improved temple mounting which will be inconspicuous in appearance.

A further object of my invention is to provide an improved temple mounting which will result in a saving of material.

Further objects and advantages of the invention will be apparent from the description and claims.

In the drawings, in which several embodiments of my invention are shown,

Figure 1 is a view looking downwardly on a pair of spectacles;

Fig. 2 is a rear view of the spectacles shown in Figure 1;

Fig. 3 is a detail view showing one manner of fastening the supporting wire to the strap;

Fig. 4 is a detail view showing one manner of securing the temple to the supporting wire;

Fig. 5 is a detail view showing another manner of mounting the temple on the supporting wire and showing the supporting wire anchored to the lens;

Fig. 6 is a detail view showing another way of securing the supporting wire to the strap;

Fig. 7 is a view looking downward on a pair of spectacles showing another form of my invention;

Fig. 8 is a perspective view showing the mounting construction of Fig. 7;

Fig. 9 is a perspective view showing another form of mounting construction;

Fig. 10 is a perspective view showing still another form of mounting;

Fig. 11 is a rear view showing still another form of mounting; and

Fig. 12 is a perspective view showing another form of lens mounting.

The construction shown comprises a pair of channel-like straps 1 each having a lens-edge engaging portion with ears extending therefrom for embracing the edges and adjacent surface portions of the lenses 2, a bridge 3 secured to these straps, a pair of temple supporting wires 4 having an anchorage portion thereof also secured to the straps 1, in general extending along, adjacent, and in the rear of the edges of the lenses 2, and a pair of temples 5 pivotally connected with the ends of the wires 4, the axes of said hinge connections being substantially vertical, whereby the temples will fold compactly.

It will be noted that the supporting wires 4 which support the temples are supported solely or mainly by the bridge 3 and that any strain put on the wires by the temples will not be transmitted to the lenses but will be transmitted to and carried solely by the bridge 3.

In the construction shown in Figs. 1 to 3, inclusive, the supporting wire 4 is secured to the lens-edge engaging portion of the lens-supporting strap. For this purpose, the supporting wire is bent or offset, as shown at 6, so as to extend from front to rear along the upper lens-edge engaging portion of the strap, as shown in Fig. 3, thence angularly or outwardly a short distance, thence upwardly and outwardly following the contour of the edge of the lens so as to be inconspicuous and so as not to interfere with vision.

In Fig. 6 is shown another method of securing the supporting wire to the strap. In this form, the end of the wire 4 extends along and is secured to the rear edge of the strap 1 in the plane of the lens-edge engaging portion thereof, as by welding, soldering, or the like.

In Figs. 1, 2 and 4 is shown one form of pivotally securing the temple to the supporting wire. In this form, the end of the supporting wire is flattened and bent to provide a U-shaped end 7 between the arms of which the end of the temple 5 is inserted. A pivot screw 8 extends through registering openings in the supporting wire and temple to provide a pivotal mounting. In this form, the portion 9 may be utilized to serve as a stop to limit the opening movement of the temple.

In Fig. 5 is shown another form of pivotal mounting for the temple. In this form, the temple is pivotally mounted on a mounting post 10 which, in turn, is secured to the rear of the supporting wire, as by soldering, welding, or the like. In this form also the end of the supporting wire is bent so as to engage over the edge of the lens to provide an anchorage 11 for the supporting wire.

The usual noseguards 12 are secured to the straps 1 in any suitable manner. If desired, the U-shaped mounting 7 shown in Fig. 4 may be made of a seperate piece from the supporting wire and secured thereto by welding or soldering. While the supporting wire shown is of round wire, it is obvious that other forms might be used, such as oval, square, or engraved.

In Figs. 1 and 2, the temples are shown as bent outwardly, downwardly, and inwardly from their point of connection with the supporting wire, thereby increasing the width of temple space between the right and left temples.

It will be seen in this construction that the wires 4 which support the temples 5 are supported entirely or mainly by the bridge 3 and that no strain on the temple will be transmitted to the lenses. It will also be seen that the mounting for the temples is such as to be inconspicuous and such as not to interfere with vision.

In Figs. 7 and 8 is shown a mounting in which the temple-supporting wires 4 are formed integral with the bridge 3. In this form the straps 1 which support the lenses 2 are secured in any suitable manner as by soldering or the like to the wire adjacent the junction of the bridge and the temple-supporting wire. The temple supporting wires extend from the portions secured to the lens-edge engaging portions rearwardly and angularly to follow the contour of the lens adjacent to and along the rear surface thereof. The wire may be oval or slightly flattened and may be bent at the bridge portion so that the flattened surface of the wire will lie substantially parallel with the nose of the wearer.

In Fig. 9 is shown a construction in which the temple-supporting wires 4 are formed integral with the bridge 3 and in which the wire is bent so that the bridge will lie slightly to the rear of the lenses. In this form the straps which support the lenses may be secured in any suitable manner to a bend 13 formed in the wire.

In Fig. 10 is shown a construction in which the temple-supporting wire 4 is secured in any suitable manner to the lens-supporting frame and in which the lens 2 itself is supported in an eyewire 14 which surrounds and embraces the rim of the lens.

In Fig. 11 is shown a construction in which the temple-supporting wires 4 extend downwardly along and adjacent the lower edge of the lenses 2 instead of along the upper edge of the lenses, the free ends of the temple-supporting wires being provided with suitable hinge members 15 for connection with the temples.

In Fig. 12 is shown a construction in which the lens 2 is mounted in a strap 1 which in turn is mounted on the temple side of the temple-supporting wire 4, the lens thus being supported solely by the temple-supporting wire.

Further modifications will be apparent to those skilled in the art and it is desired, therefore, that the invention be limited only by the prior art and the scope of the appended claims.

It will be seen that in all of the forms disclosed, the temple-supporting wire follows the contour of the edge of the lens so as not to interfere with the vision and so as to be inconspicuous. It will also be noted that in all of the forms the temple-supporting wire is supported by the nose-engaging means.

Having thus described my invention, what I claim and desire to secure by Letters Patent is:

1. A spectacle construction comprising a pair of lenses, a pair of channel-like straps embracing the edges of said lenses, respectively, at the nasal edge of the lenses, each of said straps including a lens-edge engaging portion, a bridge member for connecting said straps, and a pair of temple-supporting wire members each having an anchor anchorage portion extending therefrom and being secured directly to the lens-edge engaging portions of the strap and extending rearwardly and angularly therefrom and following the contour of the lens adjacent to and along the rear surface thereof for connection with the temple of the spectacle.

2. A spectacle construction comprising a pair of lenses, a pair of channel-like straps embracing the edges of said lenses, respectively, at the nasal edge of the lenses, each of said straps including a lens-edge engaging portion, a bridge member for connecting said straps, and a pair of temple-supporting wire members each having an anchor anchorage portion extending therefrom and being secured directly to the lens-edge engaging portions of the strap intermediate the ends thereof and extending rearwardly and angularly therefrom and following the contour of the lens adjacent to and along the rear surface thereof for connection with the temple of the spectacle.

3. A spectacle construction comprising a pair of lenses, a pair of channel-like straps embracing the edges of said lenses, respectively, at the nasal edge of the lenses, each of said straps including a lens-edge engaging portion, a wire bridge member connecting said straps, and a pair of temple-supporting wire members each being formed integrally with said wire bridge member and being secured to the lens-edge engaging portions of the strap and extending rearwardly and angularly therefrom to follow the contour of the lens adjacent to and along the rear surface thereof for connection with the temple of the spectacle.

4. A spectacle construction comprising a pair of lenses, a pair of channel-like straps embracing the edges of said lenses, respectively, at the nasal edge of the lenses, each of said straps having a lens-edge engaging portion, a bridge member for connecting said straps, and a pair of temple-supporting wire members each having an anchorage portion extending therefrom parallel to the lens-edge engaging portion of said channel-like straps and being secured directly to said straps, there being offsets extending from said portions in the direction of the lenses, said temple-supporting wire members extending from said offset portions and following the contour of the lens adjacent to and along the rear surface thereof for connection with the temple of the spectacle.

5. A spectacle construction comprising a pair of lenses, a pair of channel-like straps embracing the edges of said lenses, respectively, at the nasal edge of the lenses, each of said straps including a lens-edge engaging portion, a bridge member for connecting said straps, and a pair of temple-supporting wire members each being secured to the lens-edge engaging portions of the strap and extending rearwardly and angularly therefrom and following the contour of the lens adjacent to and along the rear surface thereof for a substantial distance, the free end portions of said temple supporting wire having a rearwardly extending portion terminating in a hinge for pivotally receiving the temple of the spectacle.

6. A spectacle construction comprising a pair of lenses, a pair of channel-like straps embracing the edges of said lenses, respectively, at the nasal edges of the lenses, each of said straps including a lens-edge engaging portion, a bridge member for connecting said straps, and a pair of temple-supporting wire members each having an anchorage portion extending therefrom and being secured to said straps in the plane of the lens-edge engaging portions thereof, said temple supporting wire member extending therefrom to follow the contour of the lens adjacent to and along the rear surface thereof for connection with the temples of the spectacle.

WILLIAM R. UHLEMANN.